United States Patent
Wyatt et al.

(10) Patent No.: US 8,046,586 B1
(45) Date of Patent: Oct. 25, 2011

(54) METHOD AND SYSTEM FOR DETERMINING THE COMPLIANCE OF ENCRYPTED AND NON-ENCRYPTED DISPLAY OUTPUTS

(75) Inventors: David Wyatt, San Jose, CA (US); Nathan C. Myers, Round Rock, TX (US)

(73) Assignee: NVIDIA Corporation, Santa Clara, CA (US)

( * ) Notice: Subject to any disclaimer, the term of this patent is extended or adjusted under 35 U.S.C. 154(b) by 934 days.

(21) Appl. No.: 11/957,378

(22) Filed: Dec. 14, 2007

(51) Int. Cl.
*G06F 21/04* (2006.01)
*H04L 9/32* (2006.01)

(52) U.S. Cl. .......................... 713/176; 713/189; 726/27

(58) Field of Classification Search .................. None
See application file for complete search history.

(56) References Cited

U.S. PATENT DOCUMENTS

| | | | |
|---|---|---|---|
| 6,836,548 B1 * | 12/2004 | Anderson et al. | 380/28 |
| 7,039,808 B1 * | 5/2006 | Fausse | 713/170 |
| 7,114,168 B1 | 9/2006 | Wyatt et al. | |
| 7,302,585 B1 * | 11/2007 | Proudler et al. | 713/189 |
| 7,380,136 B2 * | 5/2008 | Zimmer et al. | 713/193 |
| 2003/0046537 A1 * | 3/2003 | Smith | 713/161 |
| 2005/0066356 A1 | 3/2005 | Stone et al. | |
| 2006/0146056 A1 | 7/2006 | Wyatt | |
| 2007/0061875 A1 * | 3/2007 | Le Buhan et al. | 726/10 |
| 2007/0286575 A1 * | 12/2007 | Oashi et al. | 386/95 |
| 2008/0022128 A1 * | 1/2008 | Proudler et al. | 713/189 |
| 2009/0049301 A1 * | 2/2009 | Hamid et al. | 713/176 |
| 2009/0103470 A1 | 4/2009 | Candelore | |
| 2010/0161985 A1 * | 6/2010 | Alkove et al. | 713/168 |

OTHER PUBLICATIONS

Office Action in U.S. Appl. No. 11/957,377, mailed Feb. 10, 2011.

\* cited by examiner

*Primary Examiner* — Christopher Revak
(74) *Attorney, Agent, or Firm* — Patterson & Sheridan, LLP

(57) ABSTRACT

A method and system are implemented for verifying connection status information associated with a specific display attachment location. Specifically, one embodiment of the present invention sets forth a method, which includes the steps of receiving a first signature representative of a first set of connection states tracked by a graphics subsystem associated with the display attachment location, authenticating whether the integrity of a content path including the display attachment location is maintained based on the first signature, and deciding whether to continue sending the content to the display attachment location so that requirements associated with protecting the content are satisfied.

20 Claims, 10 Drawing Sheets

METHOD AND SYSTEM FOR DETERMINING THE COMPLIANCE OF ENCRYPTED AND NON-ENCRYPTED DISPLAY OUTPUTS

BACKGROUND OF THE INVENTION

1. Field of the Invention

Embodiments of the present invention relate generally to content protection techniques, and more specifically to a method and system of determining the compliance of encrypted and non-encrypted display outputs.

2. Description of the Related Art

Unless otherwise indicated herein, the approaches described in this section are not prior art to the claims in this application and are not admitted to be prior art by inclusion in this section.

Digitization of content not only provides new ways to distribute and commercialize content, but it also enables new and easier ways to violate copyright or to steal or misuse premium content such as feature films. To combat rampant piracy of digital content, some content providers have developed advanced content protection schemes in digital medium such as laser disks and cable/satellite TV, and impose strict requirements on the licensees of such conveyance schemes in order to safeguard their premium content. For example, the content protection licenses for popular content formats and mediums, such as Digital Versatile Disc ("DVD"), Blu-ray, High Definition ("HD") DVD, Fairplay, and OpenCable, include requirements of safeguarding the handling and protection of content during the decode process to prevent unintended interception and copying.

One of the requirements is to verify the compliance of the display outputs to the standards of the content protection schemes before delivering or continuing to deliver data to such display outputs. With all the different types of display devices that are available today, there is a need for a client application to efficiently and thoroughly verify the compliance of the display devices, regardless of whether the display devices support encryption.

As a part of verifying the compliance of the display outputs, especially when dealing with a graphics adapter that has many content outputs, whether the display content actually reaches an intended display output destination needs to be verified. FIG. 1 is a simplified block diagram illustrating how the content to be played by a content player 102 executing in a computer system 100 may be maliciously rerouted from an intended output destination to an unintended one. Suppose the content is initially stored in a storage device 104. To play back the content, the content player 102 causes the content to be retrieved from the storage device 104 and temporarily stores it in a specific location of the memory 106 for processing. After a conventional graphics adapter 110 in the computer system 100 processes the display content, it sends the processed content in the form of a display content stream to an intended output or an attach point 125. An attach point generally refers to a physical attachment location for a display device, such as a High-Definition Multimedia Interface ("HDMI") connector or an internal panel. Here, the graphics adapter 110 has two attach points, AP#1 and AP#2. The AP#1 is attached to a display device 132 and is the intended attach point in this illustration. Suppose the AP#1 is a Digital Visual Interface ("DVI") connection that supports High-Bandwidth Digital Content Protection ("HDCP"), and the AP#2 is associated with an unprotected analog connection to an analog display device 134. As the display content stream travels through the graphics adapter 110, a rogue agent may redirect the display content stream to the AP#2 instead. Even though the content player 102 is assured by the driver of the graphics adapter 110 that the AP#1 is the destination for the display content stream, the rogue agent can, without being detected by the content player 102, modify software-accessible registers in the graphics adapter 110 to cause the redirection of the display content stream to the unprotected AP#2. Once redirected, the display content stream can be illegally duplicated.

As the foregoing illustrates, what is needed in the art is a method and system that are capable of determining the compliance of a display output and address at least the shortcomings of the prior art approaches set forth above.

SUMMARY OF THE INVENTION

A method and system of verifying the connection status information associated with a specific display attachment location are disclosed. Specifically, one embodiment of the present invention sets forth a method, which includes the steps of receiving a first signature representative of a first set of connection states tracked by a graphics subsystem associated with the display attachment location, authenticating whether the integrity of a content path including the display attachment location is maintained based on the first signature, and deciding whether to continue sending the content to the display attachment location so that requirements associated with protecting the content are satisfied.

One advantage of the disclosed method and system is the ability to determine the compliance of a display output, whether it supports encryption or not, so that a client application can verify the integrity of a content path including an attach point and also a display device connected to the attach point in an effective and secure manner.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present application describes a method and system for determining the compliance of encrypted and non-encrypted display outputs. Throughout this disclosure, the terms "attach point" ("AP") and "display attachment location" are used interchangeably to refer to a physical location through which a display device is connected and receives display content. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Figure 1:
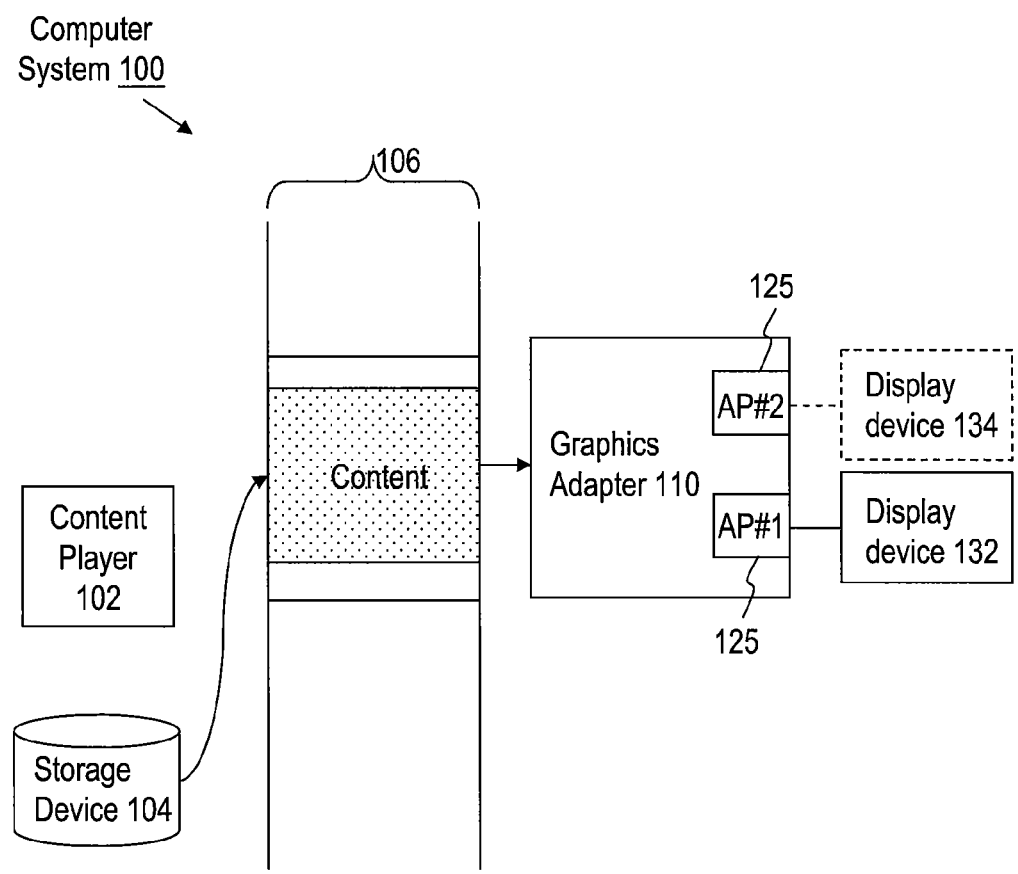
FIG. 1 is a simplified block diagram of a content player operating on a conventional computer system, wherein the content to be played back on the content player can be tampered with in a number of ways without being detected by the content player.
Figure 2A:
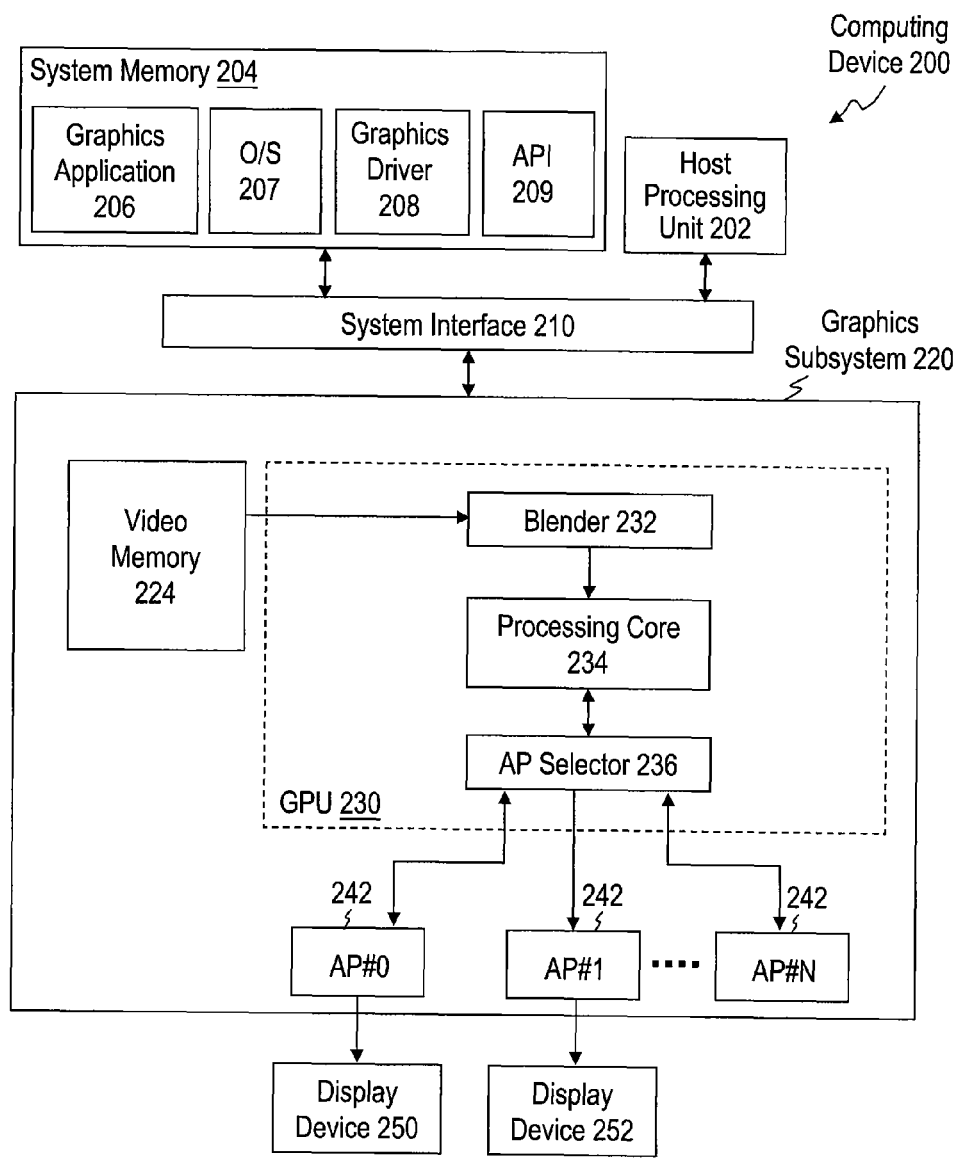
FIG. 2A is a simplified block diagram of a computing device that is configured to implement one or more aspects of the present invention.

FIG. 2A is a simplified block diagram of a computing device 200 that is configured to implement one or more aspects of the present invention. The computing device 200 includes a host processing unit 202, a system memory 204, a system interface 210, and a graphics subsystem 220 coupled with a first display device 250 and a second display device 252. The graphics subsystem 220 interacts with the host processing unit 202 and the system memory 204 via the system interface 210. Here, the system memory 204 includes a graphics application 206, an operating system 207, a graphics driver 208, and an application programming interface ("API") 209. The graphics application 206 includes programming instructions that are executable by the host processing unit 202. When the programming instructions are executed, in one path, the graphics application 206 communicates with the graphics subsystem 220 via the API 209, the operating system 207, and the graphics driver 208. In another path, the graphics application 206 bypasses the API 209 and still communicates with the graphics subsystem 220. In one implementation, the API 209 includes instruction set libraries supporting an upstream protocol associated with content protection. "Upstream" here broadly refers to a channel for the graphics subsystem 220 to communicate information back to the graphics application 206. The graphics application 206 can make use of this upstream protocol to securely monitor status and verify a connection without requiring the graphics driver 208 or the operating system 207 to perform authentication and code signing.

The graphics subsystem 220 mainly includes a video memory 224 and a GPU 230. In one implementation, the GPU 230 also includes a blender 232, a processing core 234, and an AP selector 236. To display images on either or both of the display devices 250 and 252, the graphics content data are retrieved from the video memory 224 and processed through processing core 234. Specifically, the blender 232 combines different display planes to form a display content stream or a head HD. Then the head HD is directed through an AP selector 240 to one or more selected attach points 242, to which the display devices are connected to.

In one implementation, the graphics application 206 makes decisions regarding the handling of content in view of content protection requirements. As an example, suppose the graphics application 206 is developed according to the licensed Advanced Access Content System ("AACS") specification. One of the robustness rules imposed by the AACS license agreement requires the graphics application 206 to ensure the video portion of decrypted AACS content in any usable form is reasonably secure from being intercepted or copied. Thus, one of the decisions that the graphics application 206 faces is whether the downstream path is sufficiently secure to retain the integrity of the video portion of the decrypted AACS content while still satisfying the robustness rule. Here, the graphics application 206 leverages the upstream protocol supported by the API 209 to make such a decision.

Figure 2B:
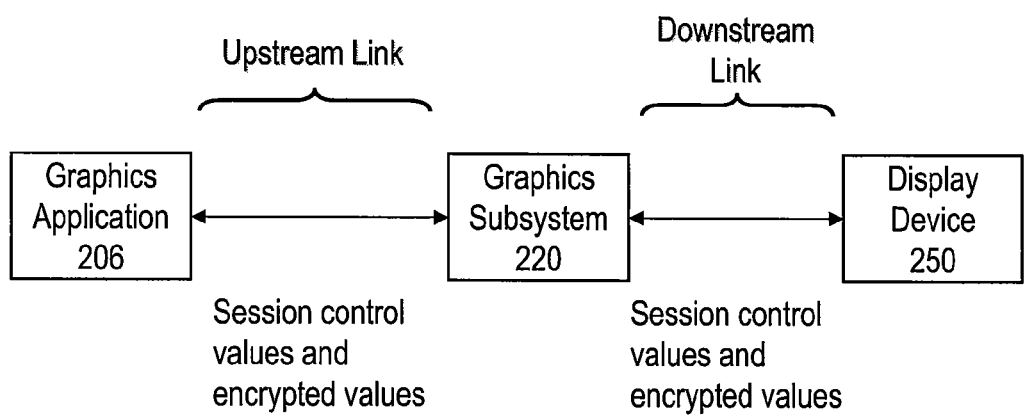
FIG. 2B is a simplified block diagram illustrating the exchanges among a graphics application, a graphics subsystem, and a display device, according to one embodiment of the present invention.

To further explain the encryption mechanism deployed in one implementation of the upstream protocol, FIG. 2B is a simplified block diagram illustrating the exchanges among the graphics application 206, the graphics subsystem 220, and the display device 250 of FIG. 2A, according to one embodiment of the present invention. First, the link between the graphics application 206 and the graphics subsystem 220 is broadly referred to as the "upstream link," and the link between the graphics subsystem 220 and the display device 250 is broadly referred to as the "downstream link." Only session control values and certain unique identifiers of the senders are exchanged on these links. In one example, these unique identifiers are Key Selection Vectors ("KSVs"). Sensitive values, such as keys needed to make sense of the KSVs, are not exchanged on the links. In one implementation, the graphics application 206 has C-keys, the graphics subsystem 220 has both A-keys and D-keys, and the display device 250 has B-keys.

Figure 3A:
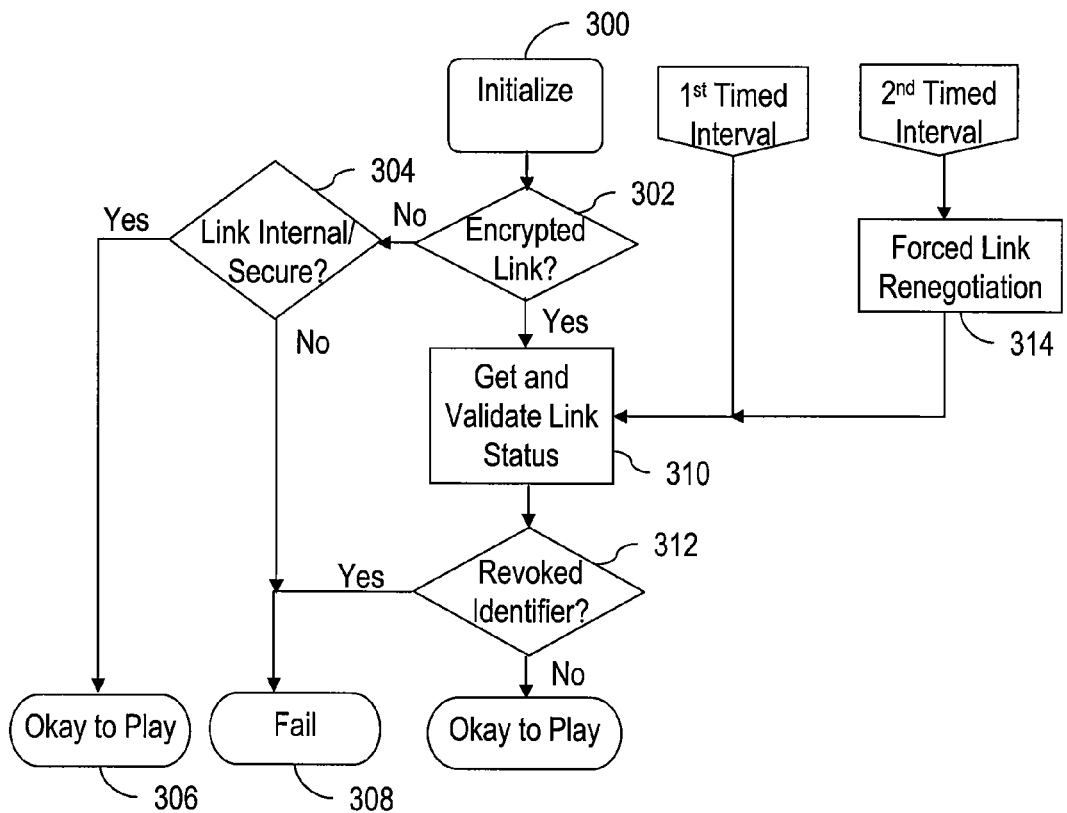
FIG. 3A is a flow chart illustrating a process that a graphics application follows to determine whether a specific display output is suitable to deliver content to, according to one embodiment of the present invention.

FIG. 3A is a flow chart illustrating a process that the graphics application 206 follows to determine whether a specific display output is suitable to deliver content to, according to one embodiment of the present invention. Referring back to FIG. 2A, suppose the graphics application 206 is a media player. Suppose further that the display device 250 is a HDCP display device, but the display device 252 is not. After the media player initializes in step 300, in step 302, it checks with the graphics subsystem 220 whether encryption for the first and the second links connected to the display devices 250 and 252, respectively, is enabled. In one implementation, the media player relies on the graphics driver 208 for a list of the enumerated display modes that the graphics subsystem 220 supports.

Figure 3B:
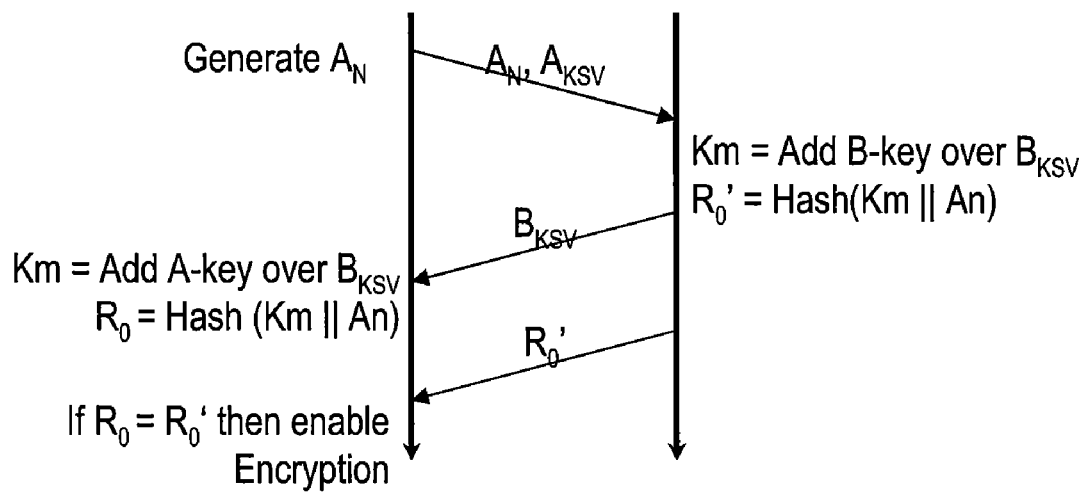
FIG. 3B is a simplified sequence diagram illustrating a process of enabling encryption in a downstream link, according to one embodiment of the present invention.

FIG. 3B is a simplified sequence diagram illustrating a process of enabling encryption in a downstream link, according to one embodiment of the present invention. $A_n$ refers to a downstream session ID that is unique to the downstream link, and it changes each time the link is established, torn down, or renegotiated. So, for the display device 250, the graphics subsystem 220 sends A and $A_{ksv}$, which is unique to the graphics subsystem 220, to the display device so that a first hash ($R_0$) can be generated using the B-keys of the display device 250, $A_n$, and $A_{ksv}$. Since the display device 250 supports HDCP, the display device 250 sends the graphics subsystem 220 $B_{ksv}$, which is unique to the display device 250, so that a second hash ($R_1$) can be generated using the A-keys of the graphics subsystem 220 and $B_{ksv}$. If $R_0$ equals to $R_1$, then the encryption for the downstream link is enabled.

If the display device does not support HDCP, such as the non-HDCP display device 252, then the downstream link is not encrypted. Further, even though a non-HDCP display device is not associated with $B_{ksv}$, it still needs to be identified so that its compliance can be evaluated. Referring back to FIG. 3A, the graphics application 206 proceeds to check whether this second link connected to the display device 252 is internal (i.e., not accessible by users) and secure in step 304. In one implementation, the graphics subsystem 220 is also asked to verify whether the non-HDCP display 252 is associated with $A_{ksv}$ before validating such a non-HDCP endpoint as compliant to playback content from the media player. In other words, if a display device does not support encryption but is identifiable with Aksv and is connect to a user-inaccessible link, then such a display device can still be considered to comply with the robustness rules as described above. So, if the second link is deemed to be secure, then the media player still proceeds to deliver content through the second link to the display device 252 in step 306. Otherwise, the media player stops sending content through the second link in step 308.

On the other hand, for the HDCP display device 250, because the associated first link is established to be an encrypted link, then the media player proceeds to get and validate certain connection status of the first link in step 310. In one implementation, the validation process involves signing, exchanging, and verifying of certain unique identifiers associated with this first link, such as the KSVs. Subsequent paragraphs will further detail the retrieval and validation process. Since unique identifiers may still be compromised, they may be revoked. Thus, before the media player begins delivering content through the first link, it checks in step 312 whether any of the unique identifiers has been revoked. If there has not been any revocation, then the media player can send content through the first link to the display device 250 with some level of confidence that the aforementioned robustness rules are adhered to. Otherwise, the media player terminates sending content through the first link. Moreover, the media player continues to monitor the first and the second links from time to time. In one implementation, at a first timed interval, the media player gets and validates the link status again to ensure the integrity of the link is maintained. At a second timed interval, which is typically longer in duration than the first timed interval, one implementation of the media player forces a renegotiation of the link in step 314.

To illustrate the retrieval and the validation process discussed above, FIG. 4A is a simplified block diagram of the processing core 234 of FIG. 2A, according to one embodiment of the present invention. The processing core 234 includes a signing logic 400, an AP status register 402 to store status information of an AP, and a connection state register 404 to store the connection state information tracked by the GPU 230, and another signature register 406 to store a signature $K_{AP}$ computed by the signing logic 400 based a number of parameters, including the collected AP status information and the connection state information. The connection state information stored in the register 404 specifies a set of connection states associated with each head in the graphics subsystem 220, including information indicative of which of the attach points 242 is connected to the head. With respect to each of the connected attach points, the AP status information tracked in the register 402 further indicates the type and connection activity of the attach point.

Figure 4A:
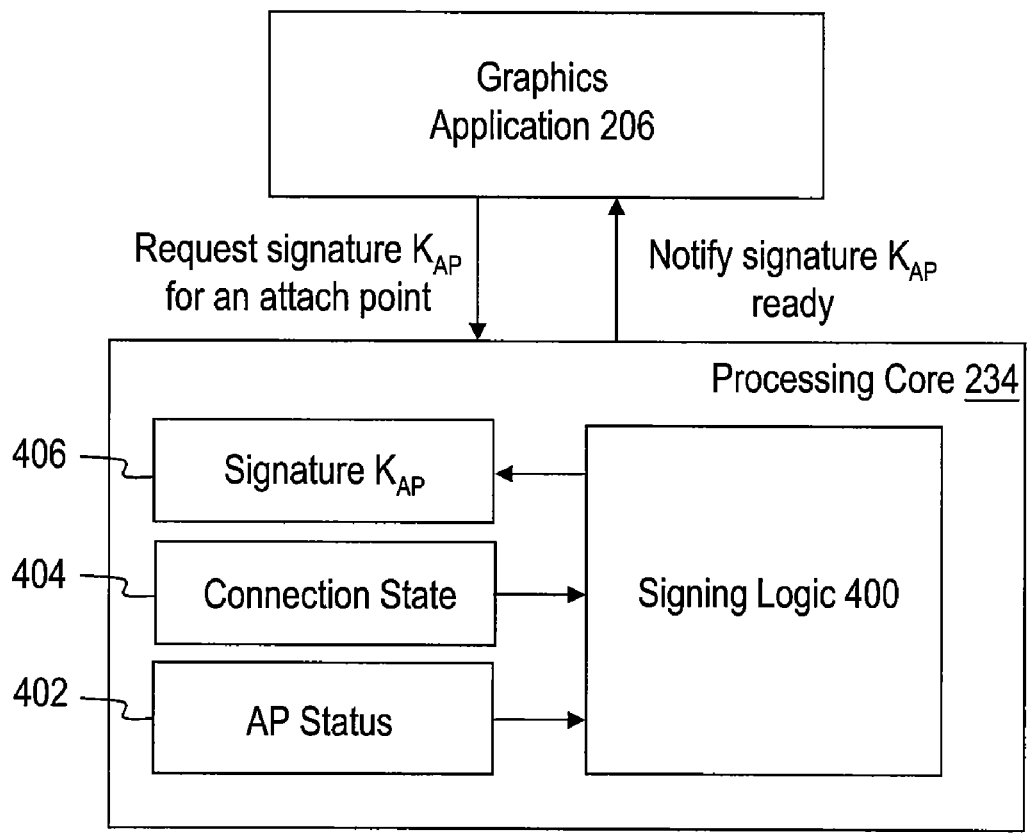
FIG. 4A is a simplified block diagram of a processing core in a GPU, according to one embodiment of the present invention.
Figure 4B:
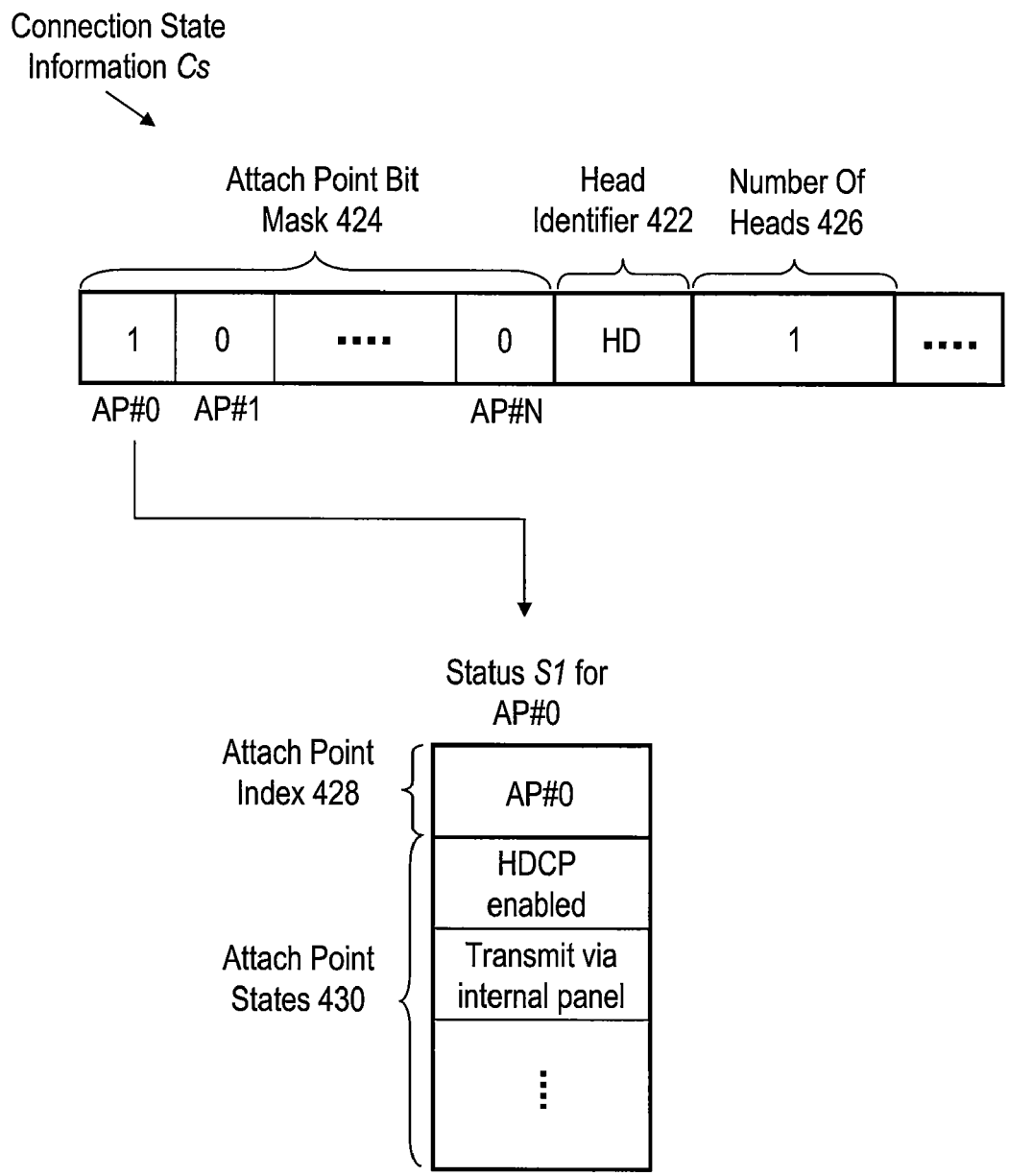
FIG. 4B is a simplified conceptual diagram illustrating examples of connection state information Cs and AP status information S1 tracked by a GPU, according to one embodiment of the present invention.

To better understand how the AP status information and the connection state information are defined, FIG. 4B is a simplified conceptual diagram illustrating examples of connection state information Cs and AP status information S1 tracked by the GPU 230 of FIG. 2A, according to one embodiment of the present invention. Suppose the AP selector 240 is configured to connect the head HD to the display device 250 via the attach point AP#0. In one implementation, Cs includes an attach point bit mask field 424 providing a one-bit flag for each attach point that is attached and actively transmitting, a head identifier field 422 indicating the source of content stream, and a number of heads field 426 indicating the number of active heads. So, for this example, the resulting set of connection state information Cs includes "1" in the number of heads field, "head HD" in the head identifier field 422, the bit flag associated with the attach point AP#0 being set to 1 while the other big flags associated with the other attach points that are not connected to the head HD are set to 0. Other information fields in the connection state information Cs include, without limitation, bit flags for planes that can be attached to the head and a bit for indicating whether a non-HDCP display device is attached to the head.

For each of the attach points that is identified as being connected to the head HD, such as AP#0, a corresponding set of AP status information, such as S1, is also tracked by the GPU 230 of FIG. 2A. The AP status information S1, which is associated with the attach point AP#0, includes an attach point index field 428 containing the indexing information of the attach point AP#0. In one implementation, such indexing information can be the bit position of AP#0 in the attach point bit mask 424 in Cs. The AP status information S1 also contains additional attach point states 430, including, without limitation, information relating to a non-compliant output, a number of connectable attach points, and whether the attach point is transmitting and the information relating to the security level of such a transmission.

Figure 5A:
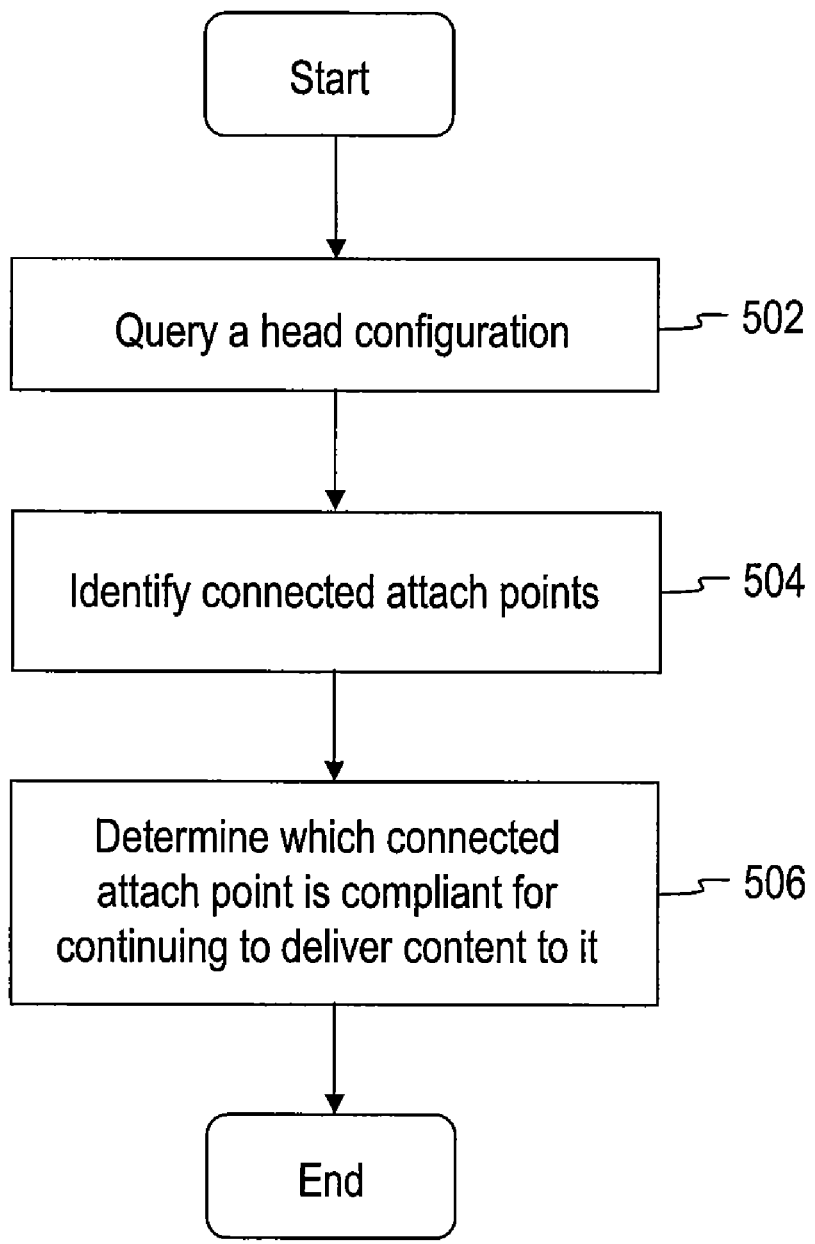
FIG. 5A is a flowchart illustrating a process for verifying the compliance of an attach point to address the inquiry of the get and validate link status step in FIG. 3A, according to one embodiment of the present invention.

Referring back to FIG. 3A, FIG. 5A is a flowchart illustrating a process for verifying the compliance of an attach point to address the inquiry of the get and validate link status step 310, according to one embodiment of the present invention. In initial step 502, the graphics application 206 of FIG. 2A queries the graphics subsystem 220 via the upstream link about the configuration of any head associated with a particular session. In one implementation, the graphics application 206 generates a client session ID (also referred to as Cn) to identify this session and sends it to the graphics subsystem 220. As shown in FIG. 4A, a set of connection state information Cs describing the configuration of an identified head HD generated by the GPU 230 is kept in the register 404. In step 504, the register 404 then is accessed to identify the attach point(s) that is connected to the head HD, such as the attach point AP#0. For each attach point that is identified as being connected to the head HD, the graphics application 206 then proceeds to determine whether it is compliant with a content protection policy and thus is suitable for continuing to deliver content to it.

Figure 5B:
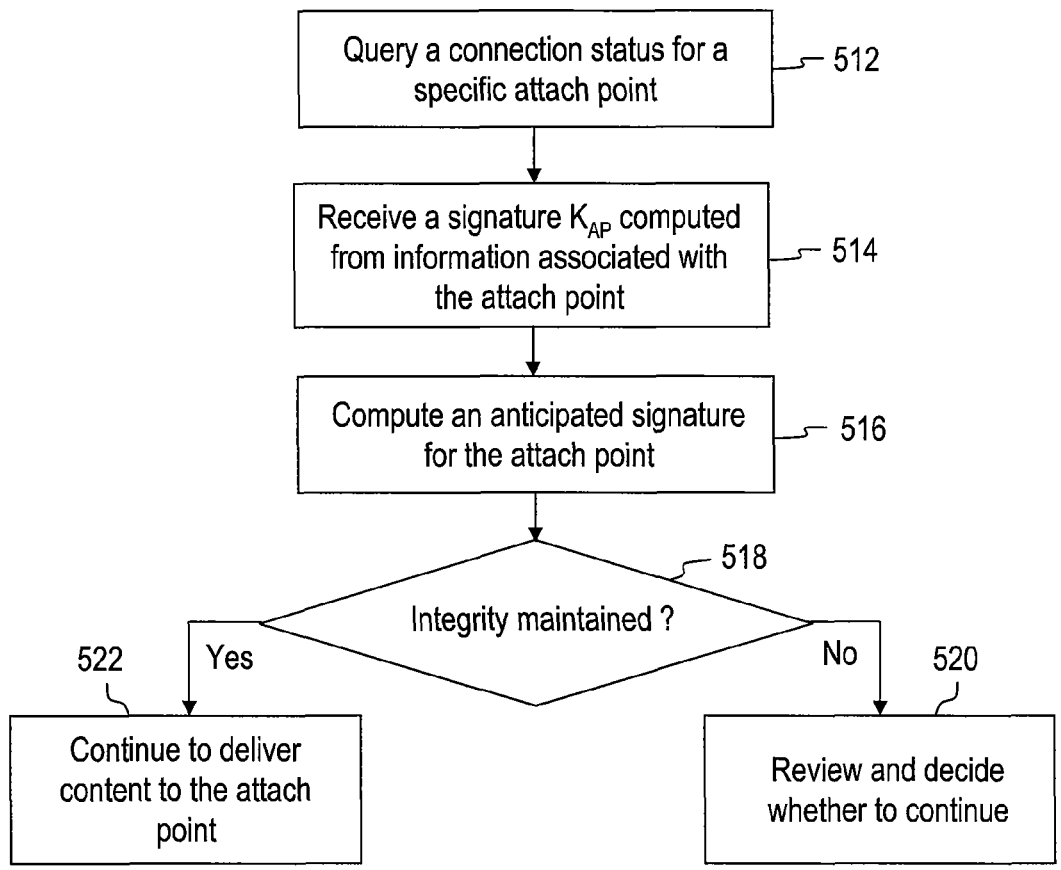
FIG. 5B is a flowchart illustrating the method steps performed by a graphics application to determine whether a specified attach point is compliant with a content protection policy, according to an embodiment of the present invention.

FIG. 5B is a flowchart showing the method steps performed by the graphics application 206 of FIG. 2A to determine the compliance of a specific attach point to a certain content protection policy. For illustration purposes, suppose the attach point to be examined is the attach point AP#0 shown in FIG. 4B. In initial step 512, the graphics application 206 queries the graphics subsystem 220 about the connection state information Cs for the attach point AP#0. In one implementation, the graphics application 206 writes the indexing information of the attach point AP#0, such as the appropriate bit position among the attach point bit mask 424, in a software-accessible register in the graphics subsystem 220. In response to this upstream link query, the signing logic 400 of the processing core 234 shown in FIG. 4A generates a signature $K_{AP}$ based on a hash of the client session ID Cn, connection state information Cs, and the AP status information S1 along with certain predetermined keys (e.g., D-keys). In step 514, the graphics application 206 receives this signature $K_{AP}$. To ensure the identity information of the attach point AP#0 has not been tampered with, in step 516, the graphics application 206 then computes an anticipated signature by performing the same signing process as the signing logic 400 on the client session ID Cn, connection state information Cs, the AP status information S1, including the indexing information of the attach point AP#0, and certain predetermined keys (e.g., C-keys). In 518, by comparing the anticipated signature and the signature $K_{AP}$ provided by the GPU 230, the graphics application 206 then determines whether the integrity of the content path through the attach point AP#0 is maintained. If the two signatures are different, then the graphics application 206 proceeds to step 520 to decide whether to continue sending content to the attach point AP#0. In one implementation, the graphics application 206 may consequently decide that the attach point is not compliant with the content protection policy and accordingly stop to deliver content to the non-compliant attach point.

On the other hand, if the anticipated signature is the same as the signature $K_{AP}$ received from the GPU 230, then the graphics application 206 has authenticated that integrity of the information relating to the content path is maintained in the graphics subsystem 220. Thus, the graphics application 206 may at this point decide in step 522 to continue delivering content to the graphics subsystem 220 and the attach point AP#0 without violating the terms imposed by the content protection license agreements that it is required to comply with.

Figure 5C:
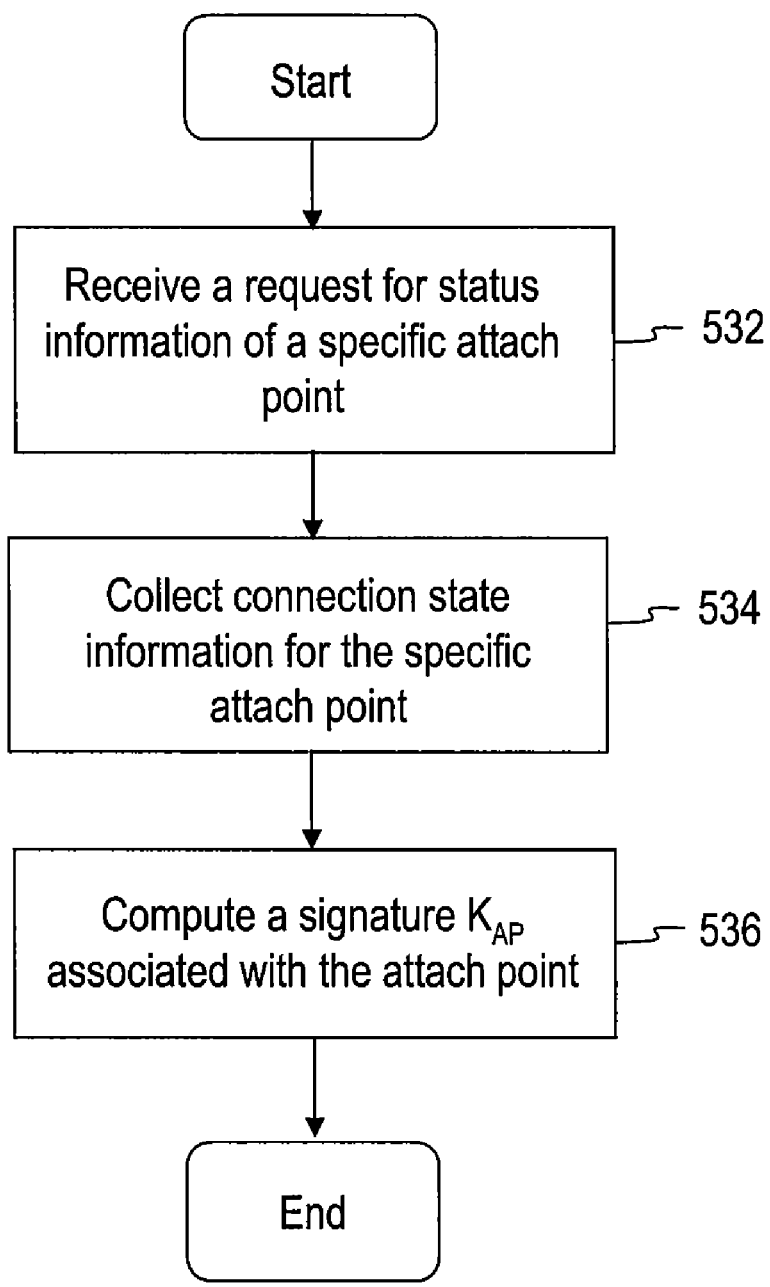
FIG. 5C is a flowchart illustrating the method steps performed by a graphics subsystem to service a request from a graphics application for the status information with respect to an attach point, according to an embodiment of the present invention.

FIG. 5C is a flowchart illustrating the method steps performed in the graphics subsystem 220 to service a request from the graphics application 206 for the status information with respect to the attach point AP#0, according to one embodiment of the present invention. In initial step 532, the graphics subsystem 220 receives the request issued by the graphics application 206. In step 534, the graphics subsystem 220 then collects the AP status information S1 for the attach point AP#0, including the indexing information for the attach point bit mask 424 in the connection state information Cs from the registers shown in FIG. 4B. A signature $K_{AP}$ then is computed by the signing logic 400 of the processing core 234 based on the client session ID Cn, collected connection state information Cs, the AP status information S1, and certain keys in step 536, and is then stored in the register 406 for the graphics application 206 to access.

As has been described above, the method and system described herein thus is able to determine the compliance of both an encrypted and a non-encrypted display device in an effective and secure manner, and the integrity of a content path through specific attach points can be verified.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

We claim:

1. A method for handing display content through a display attachment location, the method comprises:
   receiving a first signature representative of a first set of connection states tracked by a graphics subsystem associated with the display attachment location;
   authenticating whether the integrity of a content path including the display attachment location is maintained based on the first signature; and
   deciding whether to continue sending the content to the display attachment location so that requirements associated with protecting the content are satisfied.

2. The method of claim 1, wherein the authenticating step further comprises:
   computing a second signature representative of an anticipated set of connection states associated with the display attachment location; and
   comparing the first signature and the second signature.

3. The method of claim 2, wherein the first set of connection states includes identification information associated with the display attachment location.

4. The method of claim 3, further comprising including status information of the display attachment location to compute the first signature, wherein the status information includes indexing information associated with the identification information of the display attachment location.

5. The method of claim 4, further comprising including client session identification associated with the display attachment location to compute the first signature.

6. The method of claim 1, wherein the connection states include identify information of a display content stream that is attached to the display attachment location.

7. The method of claim 6, wherein the connection states include information indicating a number of display attachment locations connected to the display content stream.

8. A computing device configured to enable a client graphics application to manage the handling of content through a display attachment location, the computing device comprising:
   a graphics subsystem configured to track a first set of connection states associated with the display attachment location and generate a first signature based on the first set of connection states; and
   a host processing unit configured to execute programming instructions of the client graphics application to:
      authenticate whether the integrity of a content path including the display attachment location is maintained based on the first signature received from the graphics subsystem; and
      decide whether to continue sending the content to the display attachment location based on the requirements associated with protecting the content and the first set of connection states.

9. The computing device of claim 8, wherein the host processing unit is further configured to execute the programming instructions of the client graphics application to:
   compute a second signature representative of a second set of connection states associated with the display attachment location, wherein the second set of connection states are anticipated by the client graphics application; and
   compare the first signature and the second signature.

10. The computing device of claim 8, wherein the first set of connection states includes identification information associated with the display attachment location.

11. The computing device of claim 10, wherein the graphics subsystem is further configured to include status information of the display attachment location to compute the first signature, wherein the status information includes indexing information associated with the identification information of the display attachment location.

12. The computing device of claim 11, wherein the graphics subsystem is further configured to include client session identification associated with the display attachment location to compute the first signature.

13. The computing device of claim 8, wherein the connection states include identify information of a display content stream that is attached to the display attachment location.

14. The computing device of claim 13, wherein the connection states include information indicating a number of display attachment locations connected to the display content stream.

15. A non-transitory computer-readable storage medium containing a sequence of instructions, which when executed by a host processing unit, causes the host processing unit to:
receive a first signature representative of a first set of connection states tracked by a graphics subsystem associated with a display attachment location;
authenticate whether the integrity of a content path including the display attachment location is maintained based on the first signature; and
decide whether to continue sending the content to the display attachment location so that requirements associated with protecting the content are satisfied.

16. The non-transitory computer-readable storage medium of claim 15, further containing a sequence of instructions, which when executed by the host processing unit, causes the host processing unit to:
compute a second signature representative of an anticipated set of connection states associated with the display attachment location; and
compare the first signature and the second signature.

17. The non-transitory computer-readable storage medium of claim 15, wherein the first set of connection states includes identification information associated with the display attachment location.

18. The non-transitory computer-readable storage medium of claim 17, wherein the first signature is also representative of status information of the display attachment location, wherein the status information includes indexing information associated with the identification information of the display attachment location.

19. The non-transitory computer-readable storage medium of claim 18, wherein the first signature is also representative of client session identification associated with the display attachment location.

20. The non-transitory computer-readable storage medium of claim 15, wherein the connection states include identify information of a display content stream that is attached to the display attachment location.

* * * * *